(12) United States Patent
Rueping

(10) Patent No.: US 9,032,221 B2
(45) Date of Patent: May 12, 2015

(54) APPARATUS FOR LOGGING A CONFIGURATION OF A MICROPROCESSOR SYSTEM AND METHOD FOR LOGGING A CONFIGURATION OF A MICROPROCESSOR SYSTEM

(75) Inventor: Stefan Rueping, Lengdorf (DE)

(73) Assignee: Infineon Technologies AG, Neubiberg (DE)

( * ) Notice: Subject to any disclaimer, the term of this patent is extended or adjusted under 35 U.S.C. 154(b) by 523 days.

(21) Appl. No.: 12/892,264

(22) Filed: Sep. 28, 2010

(65) Prior Publication Data

US 2011/0078460 A1    Mar. 31, 2011

(30) Foreign Application Priority Data

Sep. 30, 2009  (DE) .......................... 10 2009 047 859
Apr. 13, 2010  (DE) .......................... 10 2010 014 748

(51) Int. Cl.
*G06F 21/00* (2013.01)
*G06F 21/62* (2013.01)
*G06F 21/57* (2013.01)

(52) U.S. Cl.
CPC .............. *G06F 21/62* (2013.01); *G06F 21/57* (2013.01); *G06F 2221/2101* (2013.01)

(58) Field of Classification Search
CPC .................................. G06F 21/57; G06F 21/62
USPC .................. 713/189, 194, 169; 257/679, 922
See application file for complete search history.

(56) References Cited

U.S. PATENT DOCUMENTS

| | | | |
|---|---|---|---|
| 5,530,753 A | 6/1996 | Easter et al. | |
| 6,195,750 B1 * | 2/2001 | Ellsworth | 713/100 |
| 7,340,597 B1 | 3/2008 | Cheriton | |
| 2005/0105738 A1 | 5/2005 | Hashimoto | |
| 2006/0212270 A1 * | 9/2006 | Shiu et al. | 702/188 |
| 2007/0156389 A1 | 7/2007 | Kilian et al. | |
| 2009/0022315 A1 * | 1/2009 | Leung | 380/255 |
| 2009/0132820 A1 * | 5/2009 | Hirai et al. | 713/169 |
| 2010/0146295 A1 * | 6/2010 | Proudler | 713/189 |

FOREIGN PATENT DOCUMENTS

| | | |
|---|---|---|
| CN | 101287218 A | 10/2008 |
| WO | 0140950 A2 | 6/2001 |

OTHER PUBLICATIONS

Jin et al "Key Evolution-Based Tamper Resistance: a Subgroup Extension" ASIACCS'07, Mar. 20-22, 2007, Singapore.; Copyright 2007 ACM 1-59593-574—Jun. 7, 0003.*
WS4D: SOA—Toolkits making embedded systems ready for Web Services; Zeeb et al; Institute of applied microelectronics and computer engineering, U of Rostock, Germany, 2007 10 pages.*

* cited by examiner

*Primary Examiner* — Jason Lee
(74) *Attorney, Agent, or Firm* — Murphy, Bilak & Homiller, PLLC

(57) ABSTRACT

An apparatus includes a logging apparatus and a configuration apparatus. The logging apparatus has a security module operable to create a manipulation-proof log. The configuration apparatus is operable to configure a configurable microprocessor system. The configuration apparatus is further operable to be coupled to the logging apparatus in order to log a configuration of the microprocessor system using the logging apparatus.

18 Claims, 2 Drawing Sheets

APPARATUS FOR LOGGING A CONFIGURATION OF A MICROPROCESSOR SYSTEM AND METHOD FOR LOGGING A CONFIGURATION OF A MICROPROCESSOR SYSTEM

PRIORITY CLAIM

This application claims priority from German Patent Application No. 10 2009 047 859.0 filed on 30 Sep. 2009, said German Patent Application incorporated herein by reference in its entirety. This application also claims priority from German Patent Application No. 10 2010 014 748.6 filed on 13 Apr. 2010.

FIELD OF THE INVENTION

The present invention relates to an apparatus and method for logging a configuration of a microprocessor system.

BACKGROUND

Microprocessor systems are systems in which all components of a processor are combined on a microchip. This may also be a microcontroller or a so-called System on Chip (SoC). Microprocessor systems often occur in the form of embedded systems in articles such as chip cards, consumer electronics, office electronics, motor vehicles, mobile telephones and even clocks. Microprocessor systems are also included in virtually all computer peripherals. The power and equipment of microprocessor systems are adapted to their respective intended use.

A multiplicity of microprocessor systems which, with largely the same design, differ in terms of their register width and clock frequency as well as in terms of their memory size and system properties, for example when in the form of a microcontroller, are known. Companies which use microprocessor systems for installation in their devices must often have a multiplicity of different microprocessor systems with different system parameters in stock in order to respond quickly and flexibly to the wishes of their customers. The storage and provision of a multiplicity of microprocessor systems require a considerable amount of effort in terms of storage and logistics. In addition, capital is bound by the need to store a multiplicity of different microprocessor systems.

In order to avoid the effort in terms of storage and logistics and the associated costs, U.S. Pat. No. 5,530,753 discloses an apparatus and a method for securely configuring a generic computer system, that is to say a computer system delivered with maximum configuration. On the basis of the maximum configuration, the customer can select the desired system properties and memory sizes and can enable them using a release code. The customer pays only for the system properties and memory sizes selected and used. The system properties and memory areas which have not been selected are blocked and are therefore not accessible to the customer.

If, for example, a semiconductor manufacturer then delivers a larger number of generic microprocessor systems with electronically releasable memory sizes and/or releasable system modules to a customer, with the result that the latter can accordingly configure the microprocessor systems in accordance with the end customers, the customer would have to retrieve the corresponding release code from the semiconductor manufacturer in a timely manner for each microprocessor system to be configured. This would have the disadvantage of the semiconductor manufacturer being forced to provide a multiplicity of release codes around the clock in order to allow configuration-dependent billing. On the other hand, the customer would have to retrieve the necessary release codes in good time and would have to enter them in his production system. The practices of providing and retrieving a large number of release codes for configurable microprocessor systems therefore entail a large amount of effort in terms of logistics and therefore high costs both for the semiconductor manufacturer and for the customer.

SUMMARY

An apparatus and a method are provided for securely logging a configuration of a microprocessor system according to the embodiments described herein. The use of an apparatus which has a logging apparatus having a security module makes it possible to create a manipulation-proof log. As a result of the creation of a manipulation-proof log, the semiconductor manufacturer, for example, is able to obtain secure information relating to the configurations selected by the customer for his microprocessor systems, on the basis of which configurations the manufacturer can make out a bill.

If the semiconductor manufacturer leaves the logging of the configurations of the microprocessor systems entirely to the customer, he is exposing himself to the risk of manipulation by the customer. It is difficult or even impossible for the semiconductor manufacturer to understand which configuration parameters and thus which memory sizes and/or memory modules, on which the bill is ultimately based, have been selected. Such a manipulation possibility is avoided with the concept described above.

The security module may be, for example, an encryption module, a so-called cryptomodule.

The logging apparatus can be coupled to a configuration apparatus in order to transmit a configuration parameter between the configuration apparatus and the logging apparatus. This may be effected using non-permanent coupling, which only temporarily couples the logging apparatus and the configuration apparatus, or using permanent coupling between the logging apparatus and the configuration apparatus, for example in the form of a data cable.

The logging apparatus could be, for example, a security controller. The security controller comprises a security module. In one exemplary embodiment, the security module could be in the form of a cryptomodule. The security module ensures, for example, that the data generated by the logging apparatus are encrypted and that the required key is interchanged with the configuration apparatus and/or an external data line and/or an external data memory, for example. It is thus possible to ensure that the configuration parameters used are logged in a secure manner which cannot be manipulated.

In another exemplary embodiment, the logging apparatus is connected to the configuration apparatus via a secure data channel. For this purpose, the data channel may have sensors, which detect manipulation, or a special structure with screened lines. In order to increase security, the data transmitted via the data channel can be encrypted, for example using a cryptomodule.

In another exemplary embodiment, the microprocessor system is blocked after configuration. Blocking can be implemented, for example, by blowing fuses inside the microprocessor system. Blocking prevents the configuration of the microprocessor system from being able to be subsequently changed.

In order to securely store the logged data, the logging apparatus may have a secure data memory. The log data may be stored in the secure data memory in encrypted form, for example. Encryption can be carried out by the existing security module. The data memory can also be protected against manipulation from the outside using corresponding sensors or a corresponding structure. The data memory is read, for example, in a contactless manner via a suitable interface or using contacts via a line.

In yet another exemplary embodiment, the logging apparatus is connected to a data communication apparatus. The data communication apparatus ensures that the log data are forwarded to the semiconductor manufacturer, for example. Data can be communicated in a wired manner, in a wireless manner or in both a wired and wireless manner and via an Internet and/or telephone connection, for example. In one particular embodiment, the data communication apparatus additionally has a data memory for buffering the log data.

In still another exemplary embodiment, the logging apparatus is designed to generate a release code having at least one configuration parameter. Configuration parameters are, for example, memory sizes which can be selected, modules which can be connected, for example cryptomodules, interface modules and/or security modules, processors which can be connected, for example co-processors and/or cryptoprocessors, system modules which can be connected or software blocks and/or software libraries which can be connected. The logging apparatus generates a release code according to the desired configuration parameter(s). The configuration apparatus knows, from the configuration-dependent release code which is transmitted to the configuration apparatus, how it should configure the microprocessor system. In order to protect against manipulation, the release code can be cryptographically protected against manipulation. The cryptographic protection may be effected, for example, by encrypting the release code by means of the security module of the logging apparatus. In a first exemplary embodiment, an individual release code is generated for each microprocessor system to be configured. In another exemplary embodiment, a release code is generated for a group of microprocessor systems. The configurations of the microprocessor systems which are carried out using the release codes are logged in the logging apparatus.

In another exemplary embodiment, secure communication between the logging apparatus and the configuration apparatus takes place via a secure communication channel. For example, the configuration apparatus transmits the configuration data relating to a configuration of the microprocessor system to the logging apparatus. The configuration data can be directly input to the configuration apparatus. Following configuration, the microprocessor system can be blocked. The secure communication channel can be cryptographically protected against manipulation. The security module in the logging apparatus can be used for cryptographic protection.

In another exemplary embodiment, the apparatus is directly integrated in a microprocessor system. The logging apparatus and the configuration apparatus are then both part of the microprocessor system.

The method for securely logging a configuration of a configurable microprocessor system includes coupling the microprocessor system to a configuration apparatus, securely logging a configuration parameter, and configuring the microprocessor system according to the configuration parameter.

Securely logging the configuration of a microprocessor system ensures that a semiconductor manufacturer, for example, receives a secure log of the configurations of the configurable microprocessor systems delivered by him, which configurations are used by his customer, the customer.

On the basis of the secure log, the semiconductor manufacturer can then make out a bill for the customer for the configured microprocessor systems.

After the microprocessor system has been configured, the system can be blocked, for example using a blocking command, with the result that it is no longer possible to subsequently change the configuration.

The configuration parameter(s) used, for example memory sizes which can be selected, modules which can be connected, for example cryptomodules, interface modules and/or security modules, processors which can be connected, for example co-processors and/or cryptoprocessors, system modules which can be connected or software blocks and/or software libraries which can be connected, can be stored on a secure data storage medium, for example.

In another exemplary embodiment, it is also possible to forward the configuration parameter to a data communication apparatus directly or after buffering in a secure data memory.

In another exemplary embodiment, a release code is generated by the logging apparatus, the release code containing at least one configuration parameter. The configuration apparatus then configures the microprocessor system according to the release code. The release code may be cryptographically protected against manipulation. A microprocessor system can be configured using an individually assigned release code. In another exemplary embodiment, an entire group of microprocessor systems can be configured using only one assigned release code.

In another exemplary embodiment, the configuration apparatus transmits the configuration parameter to the logging apparatus via a secure communication channel. The communication channel can be cryptographically protected against manipulation in this exemplary embodiment as well.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
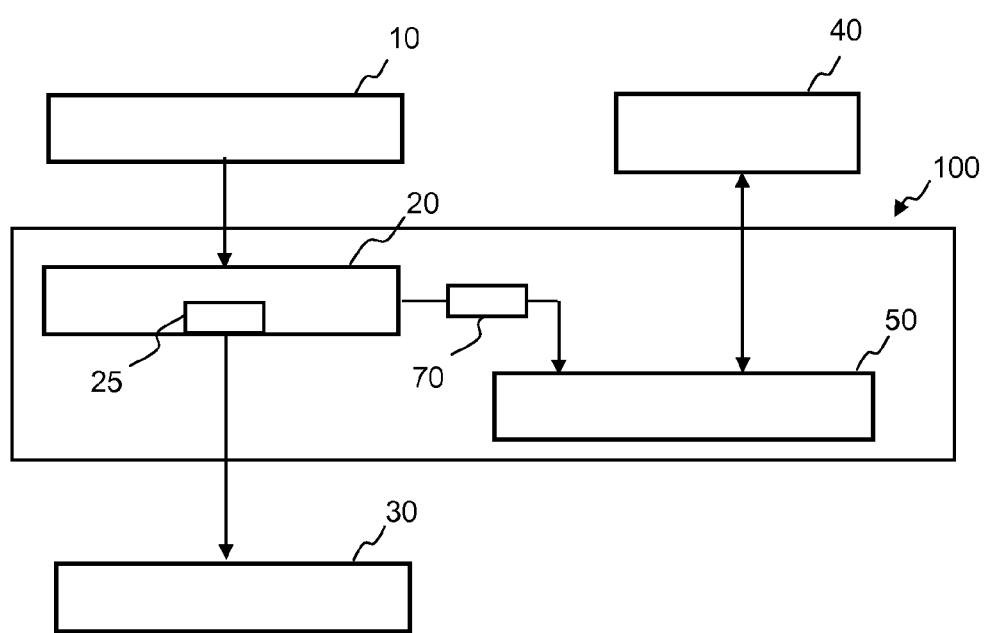
FIG. 1 shows a diagrammatic illustration of a first exemplary embodiment of an apparatus for securely logging a configuration carried out on a microprocessor system.

FIG. 1 shows a diagrammatic illustration of a first exemplary embodiment of an apparatus 100 for securely logging a configuration carried out on a microprocessor system 40. The apparatus 100 includes a logging apparatus 20 having a security module 25 for creating a manipulation-proof log 30. A configuration apparatus 50 is connected to the logging apparatus 20. The configuration of a microprocessor system or of a group of microprocessor systems can be transmitted to the logging apparatus 20 via an input terminal 10. The configuration data can be transmitted in this case from the input terminal 10 to the logging apparatus 20 via a normal data cable or in a contactless manner, for example by means of Bluetooth. Other possibilities for transmitting configuration data to the logging apparatus are also possible. For example, configurations can be stored on a data storage medium, for example a flash memory, and can be transmitted from the data storage medium to the logging apparatus.

The logging apparatus 20 generates a release code 70 on the basis of the desired configuration of the microprocessor system 40. The release code 70 can be generated in a manipulation-proof manner with the aid of the security module 25 which may be part of the logging apparatus 20. If the security module 25 is a cryptomodule, for example, the release code 70 can be cryptographically encrypted. The microprocessor system 40 or the configuration apparatus 50 can then decrypt the release code using a stored key, which may be stored in the configuration apparatus 50, and can bring about the selected configuration.

For the purpose of configuration, the microprocessor system 40 can be coupled to the configuration apparatus 50, that is there may be either permanent coupling or non-permanent coupling between the microprocessor system 40 and the configuration apparatus 50. The coupling may be contactless or may use contacts.

If the configuration apparatus 50 receives the release code 70 directly from the logging apparatus 20, the configuration apparatus 50 configures the microprocessor system 40 according to the configuration parameters stored in the release code 70. The logging apparatus 20 logs the configuration of the microprocessor system 40 in a secure log 30. The log 30 is accordingly protected against manipulation from the outside. The log 30 can also be protected, for example, by means of encryption using the security module 25.

On the basis of the configuration data logged in the log 30, a bill can be made out, for example, between a semiconductor manufacturer, who has delivered the configurable microprocessor systems 40, and his customer who has carried out the configuration. The configured microprocessor system 40 contains the configuration parameter(s) desired by the customer, for example a particular memory size and/or connected system modules.

Figure 2:
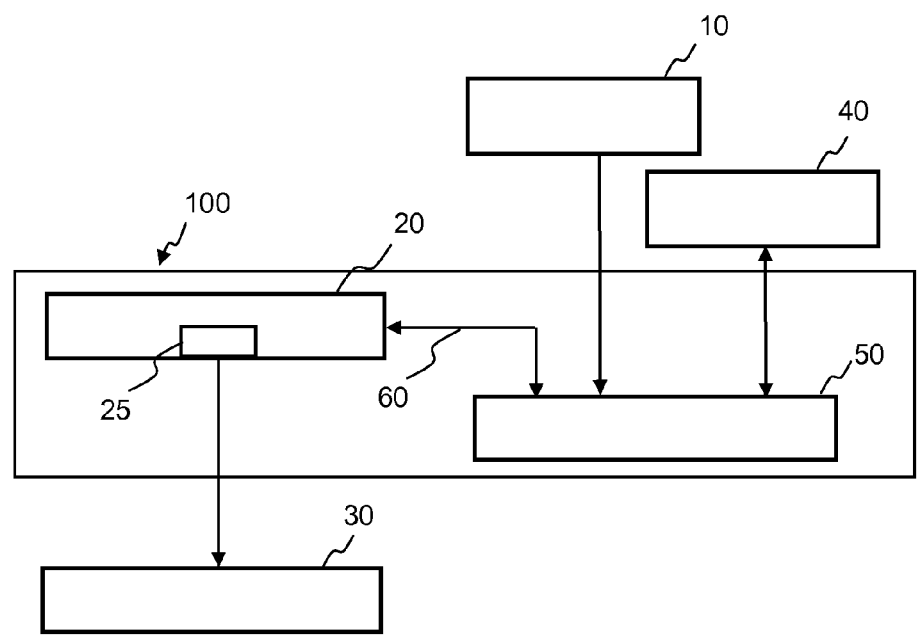
FIG. 2 shows a diagrammatic illustration of a second exemplary embodiment of an apparatus for securely logging a configuration carried out on a microprocessor system.

FIG. 2 shows a diagrammatic illustration of a second exemplary embodiment of the apparatus 100. In contrast to the structure illustrated in FIG. 1, the input terminal 10 is directly connected to the configuration apparatus 50 according to this embodiment. Furthermore, the configuration apparatus 50 communicates with the logging apparatus 20 via a secure communication channel 60. The desired configuration of the microprocessor system 40 is input to the input terminal 10 by the customer.

The microprocessor system 40 is configurable and can be provided to the customer either in a maximum configuration or in a minimum configuration, depending on the billing model. When provided in the maximum configuration, the customer can use the secure log 30 to prove that the customer has configured the microprocessor system 40 with a smaller configuration which is thus more cost-effective for the customer. When provided in the minimum configuration, the supplier of the configurable microprocessor system 40, for example the semiconductor manufacturer, can use the secure log 30, for example, to prove that additional, possibly chargeable configuration parameters have been used. In other words, the customer with a maximum configuration blocks system and/or memory modules which are not required, whereas the customer with the minimum configuration releases system and/or memory modules which are required. The customer uses his requirements to determine how to configure the microprocessor system 40. For example, particular memory sizes and/or different system modules of the microprocessor system 40 may be used. The configuration of a generic microprocessor system 40 saves the customer the storage of a multiplicity of similar microprocessor systems 40.

A bill is made out on the basis of the configurations carried out, for example with the manufacturer of the microprocessor systems 40, that is to say the semiconductor manufacturer for example. For this purpose, the configuration apparatus 50 transmits the configuration of each microprocessor system 40 and/or of a group of microprocessor systems 40 to the logging apparatus 20 via a secure communication channel 60.

The logging apparatus 20 comprises a security module 25 which can be used to protect communication. The security module 25 may be a cryptomodule, for example. The logging apparatus 20 generates a secure log 30, on the basis of which the bill for the configurations carried out can be subsequently made. The configurable microprocessor system 40 can be blocked in order to prevent the configuration from being subsequently changed.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An apparatus comprising:
   a logging apparatus having a security module operable to create a manipulation-proof log; and
   a configuration apparatus operable to configure a microprocessor system according to one or more configuration parameters, the configuration apparatus being further operable to be coupled to the logging apparatus in order to log a configuration of the microprocessor system using the logging apparatus;
   wherein said one or more configuration parameters comprise at least one of:
   a memory size for the microprocessor system,
   a module connected with the microprocessor system,
   a processor connected with the microprocessor system,
   a system module connected with the microprocessor system, and
   a software block or software library connected with the microprocessor system;
   wherein the logging apparatus is operable to generate a release code having at least one configuration parameter and to allow the microprocessor system to be configured according to the configuration parameter of the release code by means of the configuration apparatus, and wherein the logging apparatus is operable to generate the release code so that the release code is cryptographically protected against manipulation.

2. The apparatus according to claim 1, wherein the microprocessor system is operable to being configured in such a manner that the configuration of the microprocessor system can no longer be changed after the manipulation-proof log has been created by the logging apparatus.

3. The apparatus according to claim 1, wherein the logging apparatus has a secure data memory.

4. The apparatus according to claim 1, wherein the logging apparatus is connected to a data communication apparatus.

5. The apparatus according to claim 1, wherein the logging apparatus is operable to generate an individual release code for each microprocessor system to be configured.

6. The apparatus according to claim 1, wherein the logging apparatus is operable to generate an individual release code for a group of microprocessor systems to be configured.

7. The apparatus according to claim 1, further comprising a secure communication channel operable to connect the logging apparatus and the configuration apparatus.

8. The apparatus according to claim 7, wherein the secure communication channel is cryptographically protected against manipulation.

9. The apparatus according to claim 7, wherein the configuration apparatus is operable to transmit a configuration parameter relating to the configuration of the microprocessor system to the logging apparatus via the secure communication channel.

10. A microprocessor system comprising:
- a logging apparatus having a security module operable to create a manipulation-proof log; and
- a configuration apparatus operable to configure the microprocessor system according to one or more configuration parameters, the configuration apparatus being further operable to be coupled to the logging apparatus in order to log a configuration of the microprocessor system using the logging apparatus;

wherein said one or more configuration parameters comprise at least one of:
- a memory size for the microprocessor system,
- a module connected with the microprocessor system,
- a processor connected with the microprocessor system,
- a system module connected with the microprocessor system, and
- a software block or software library connected with the microprocessor system;

wherein the logging apparatus is operable to generate a release code having at least one configuration parameter and to allow the microprocessor system to be configured according to the configuration parameter of the release code by means of the configuration apparatus, and wherein the logging apparatus is operable to generate the release code so that the release code is cryptographically protected against manipulation.

11. A method for securely logging a configuration of a configurable microprocessor system, comprising:
- coupling the microprocessor system to a configuration apparatus;
- securely logging a configuration parameter;
- configuring the microprocessor system according to the configuration parameter;
- generating a release code having at least one configuration parameter;
- configuring the microprocessor system according to the release code; and
- cryptographically protecting the release code;

wherein said configuration parameter comprises at least one of:
- a memory size for the microprocessor system,
- a module connected with the microprocessor system,
- a processor connected with the microprocessor system,
- a system module connected with the microprocessor system, and
- a software block or software library connected with the microprocessor system.

12. The method according to claim 11, further comprising blocking the microprocessor system after configuration has been concluded.

13. The method according to claim 11, further comprising storing the configuration parameters in a secure data memory.

14. The method according to claim 11, further comprising:
- cryptographically protecting the configuration parameter; and
- forwarding the cryptographically protected configuration parameter to a data communication apparatus.

15. The method according to claim 11, further comprising:
- configuring a plurality of microprocessor systems; and
- generating an individual release code for each microprocessor system to be configured.

16. The method according to claim 11, further comprising:
- configuring a group of microprocessor systems; and
- generating an individual release code for the group of microprocessor systems to be configured.

17. The method according to claim 11, wherein the configuration apparatus transmits the configuration parameter to a logging apparatus via a secure communication channel.

18. The method according to claim 17, further comprising cryptographically protecting the communication channel against manipulation.

* * * * *